W. S. Tilton,
Corn Harvester
No. 15152          Patented June 17, 1856.
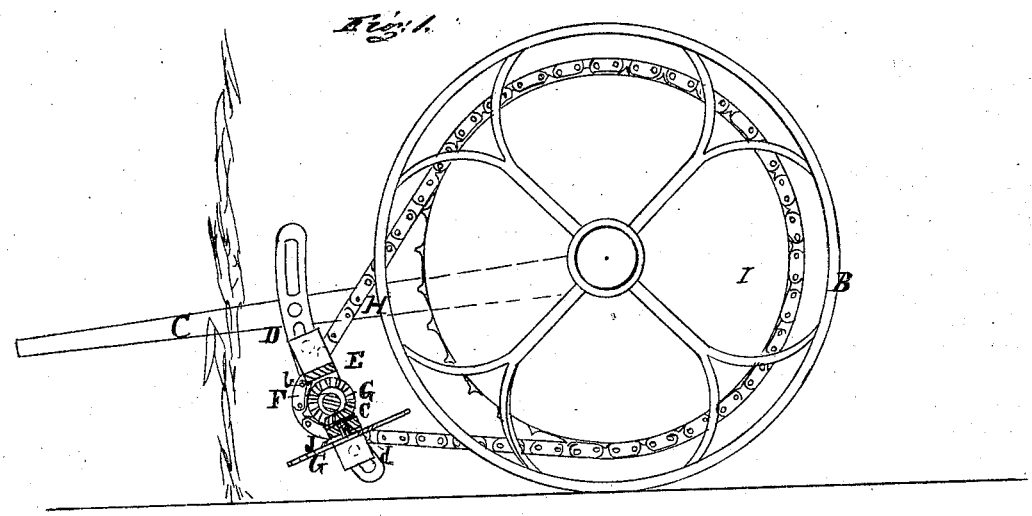
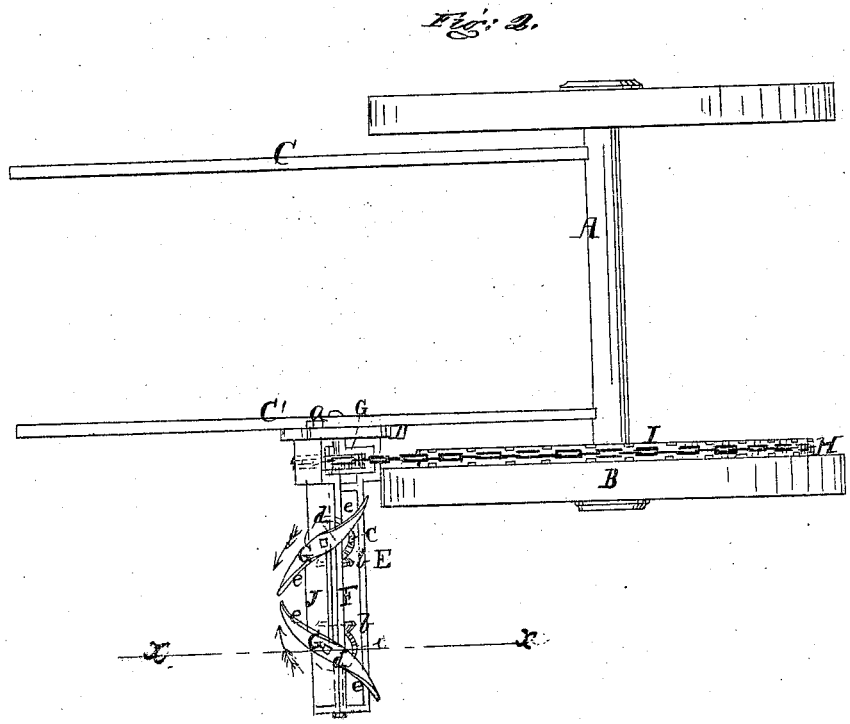

UNITED STATES PATENT OFFICE.

W. S. TILTON, OF BOSTON, MASSACHUSETTS.

IMPROVEMENT IN CORN-HARVESTERS.

Specification forming part of Letters Patent No. 15,152, dated June 17, 1856.

*To all whom it may concern:*

Be it known that I, W. S. TILTON, of Boston, in the county of Suffolk and State of Massachusetts, have invented a new and Improved Machine for Cutting Down Standing Cornstalks; and I do hereby declare that the following is a full, clear, and exact description of the same, reference being had to the annexed drawings, making a part of this specification, in which—

Figure 1 is a side view of my improvement, the cutter-frame being bisected transversely, as shown by the line *x x*, Fig. 2. Fig. 2 is an inverted plan of the same.

Similar letters of reference indicate corresponding parts in the two figures.

My invention consists in the employment or use of two rotating cutters and a stationary knife arranged and operating as will be hereinafter fully shown and described.

To enable those skilled in the art to fully understand and construct my invention, I will proceed to describe it.

A represents an axle having a wheel on each end, B being the driving-wheel. To the axle A shafts or thills C C' are attached.

To one of the shafts, C', a slotted segment-bar, D, is attached, and a frame, E, is secured to the bar D by screws *a*, which pass through the slots in the bar and into the end of the frame E.

F is a shaft, which is placed longitudinally in the frame E, said shaft having a pulley, G, on its inner end, around which a chain, H, passes, said chain also passing around a pulley, I, attached to the inner side of the wheel B. The two pulleys have recesses cut in their peripheries to receive the links of the chain H and prevent the slipping of the same.

On the shaft F there are placed two beveled pinions, *b b*, which gear into corresponding pinions, *c c*, placed on vertical shafts *d d* in the frame E. The lower ends of the shafts *d d* have each a cutter, G, attached to them. The form of these cutters is plainly shown in Fig. 2, the cutters being formed each of a bar having a cutting-edge, *e*, each side of its point of attachment to the shaft *d*, the cutting-edge at one end of the bar being at the side opposite to that of the other, the cutting-edges being curved, as represented in Fig. 2.

To the under side of the frame E there is attached permanently a knife, J, the cutting-edge of which projects a short distance in front of the frame E, and is of slightly rounded or curved form. The cutters G G as they rotate work over the knife J.

The operation will be readily seen. As the implement is drawn along the two cutters G G are rotated by the chain H, and the standing stalks (shown in red, Fig. 1) will be encompassed and drawn toward the knife J by the cutters G G, the stalks being cut between the cutters and knife.

The frame E may be raised or lowered by loosening the screws *a*, so that the cutters and knife may be placed the desired height from the ground.

The above device is extremely simple, and will work effectively and rapidly, saving much labor and time. Two frames E may be used, if desired, one attached to each shaft, so that two rows of stalks may be cut at the same time.

Having thus described my invention, what I claim as new, and desire to secure by Letters Patent, is—

The rotating cutters G G and stationary knife J, placed within an adjustable frame, E, arranged as described, for the purpose specified.

WILLIAM S. TILTON.

Witnesses:
M. H. CALL,
GEO. H. TILTON.